United States Patent
Rothschild et al.

(10) Patent No.: US 11,553,159 B1
(45) Date of Patent: Jan. 10, 2023

(54) CONTINUOUS VIDEO GENERATION FROM VOICE DATA

(71) Applicant: EMC IP Holding Company LLC, Hopkinton, MA (US)

(72) Inventors: Seth Jacob Rothschild, Littleton, MA (US); Alex Robbins, Cambridge, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/443,121

(22) Filed: Jul. 21, 2021

(51) Int. Cl.
| | |
|---|---|
| *H04N 7/15* | (2006.01) |
| *G06F 16/783* | (2019.01) |
| *H04N 5/265* | (2006.01) |
| *G06V 40/16* | (2022.01) |

(52) U.S. Cl.
CPC ......... *H04N 7/157* (2013.01); *G06F 16/7834* (2019.01); *G06V 40/176* (2022.01); *H04N 5/265* (2013.01); *H04N 7/152* (2013.01)

(58) Field of Classification Search
CPC ........ H04N 7/15; H04N 5/265; G06F 16/783; G06K 9/00
USPC ............................................ 348/14.01–14.16
See application file for complete search history.

(56) References Cited

U.S. PATENT DOCUMENTS

| | | | |
|---|---|---|---|
| 6,208,373 B1* | 3/2001 | Fong .................. | H04N 7/144 348/14.03 |
| 9,204,098 B1* | 12/2015 | Cunico ............... | H04N 7/155 |
| 10,440,324 B1* | 10/2019 | Lichtenberg ........ | H04N 7/15 |
| 10,904,488 B1* | 1/2021 | Weisz ................. | H04N 7/152 |
| 2010/0201780 A1* | 8/2010 | Bennett .............. | H04L 65/765 348/14.12 |

* cited by examiner

*Primary Examiner* — Melur Ramakrishnaiah
(74) *Attorney, Agent, or Firm* — Workman Nydegger (57) ABSTRACT

One example method includes capturing audio data at a client engine while outputting an output video, the output video being based upon an original video stored at the client engine, delivering the captured audio data to a prediction engine upon the captured audio data being captured for a pre-determined time, receiving from the prediction engine substitute frame data used by the client engine to stitch one or more frames into the original video stored at the client engine, and following stitching the one or more frames into the output video to generate an altered output video, outputting the captured audio data and the altered video from the client engine.

20 Claims, 8 Drawing Sheets

CONTINUOUS VIDEO GENERATION FROM VOICE DATA

FIELD OF THE INVENTION

Embodiments of the present invention generally relate to methods and systems for continuous video generation from audio data. More particularly, at least some embodiments of the invention relate to systems, hardware, software, computer-readable media, and methods for combining audio data with video data that has been selectively altered or augmented from original video data to create a continuous video stream.

BACKGROUND

Even though it might be desirable to have video captured through a camera for a meeting, there are many valid reasons people do not stream the video from the camera. For instance, an available connection speed with a local area network, and subsequently to the Internet or wide area network, might be insufficient to deliver a video stream without interruption. In another case, video conference participates can become self-conscious, triggering anxiety, when they recognize that they are being continuously viewed or watched by other video conference participates.

While there might be many valid reasons to deactivate or not turn on their video, there remain video conference etiquette or norms which spur users to include a video component with their meeting participation. It would be beneficial to bridge the gap between providing video during a video conference, for example, while accommodating individuals wishing to participate without live video.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data processing in a video processing environment where audio data is combined with altered or augmented previously recorded or captured video to generate a video stream. More particularly, at least some embodiments of the invention relate to systems, hardware, software, computer-readable media, and methods for continuous video generation from audio data. More particularly, at least some embodiments of the invention relate to systems, hardware, software, computer-readable media, and methods for combining audio data with video data that is based upon previously recorded or captured video data that has been altered or augmented to approximate, for instance, facial speaking movements of a user.

In one embodiment, the systems, hardware, software, computer-readable media, and methods operate as a pipeline, streaming audio and video data where the video data is generated using a machined learned model, such as a pre-trained prediction model, that predicts facial speaking movements of a user's face and identifies specific video frames for substitution into a pre-recorded or pre-captured video to approximate the facial speaking movements associated with separately captured audio data. The output video stream of a client or client engine includes the audio data and the video data, where the video data is a combination of a previously recorded original video data altered or augmented with one or more frames to approximate a user's facial speaking movements, so the video output stream includes audio data synchronized with the generated video data. This altered or augmented video stream can be tied into a video conference software as a virtual camera to allow the user of the video conference software to speak on camera without having video of the camera being in an on state.

In another embodiment, the systems, hardware, software, computer-readable media, and methods provide a continuous stream constructed of video data and audio data, where the video data is based on an original video of a user's face and the audio data is real-time, or substantially real-time, voice audio data, with the original video being altered or augmented based upon an output from a prediction model. The resultant output video stream from the client engine appears to those viewing the data vide stream to be the person in the original video speaking the words associated with the audio data. This output video is produced in segments quickly enough to be used as a continuous output, with such an output capable of being streamed to an external system so that the stream acts as virtual camera for the user.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that video data for a video stream is provided without it being recorded at a particular time, thereby reducing underlying processing or computing needs to provide the video data and so the video stream, such as associated with video conferencing for example. Additionally, at least some of the embodiments of the invention separate processing or computing of audio data and video data for a continuously generated video thereby increasing the number of possible processing or computing devices capable of generating the video. This is particularly beneficial when portions of the generated video are generated from a machined learned model, that is optionally situated on a server in a client-server environment. Furthermore, another advantageous aspect of at least some embodiments of the invention is that the voice-to-face technique generates video from real-time audio rather using pre-existing video data and audio data to create a video stream. This provides enhanced flexibility to video generation with real-time audio.

It is noted that embodiments of the invention, whether claimed or not, cannot be performed, practically or otherwise, in the mind of a human. As indicated by the illustrative examples disclosed herein, embodiments of the invention are applicable to, and find practical usage in, environments in which video is generated from real-time audio to generate a continuous stream of video associated with the real-time audio, whether or not such audio is streamed with the video or as a separate stream. Such handling and processing are well beyond the mental capabilities of any human to perform practically, or otherwise. Thus, simplistic examples are disclosed herein, those are only for the purpose of illustration and to simplify the discussion. Accordingly, nothing herein should be construed as teaching or suggesting that any aspect of any embodiment of the invention could or would be performed, practically or otherwise, in the mind of a human.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data processing and transmission that may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

In general, embodiments of the invention may be implemented in connection with systems, software, and components, that individually and/or collectively implement, and/or cause the implementation of, or are otherwise associated with cloud computing environments, which may or may not be public, include storage environments that may provide data protection functionality for one or more clients. Another example of a cloud computing environment is one in which processing, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Figure 1:
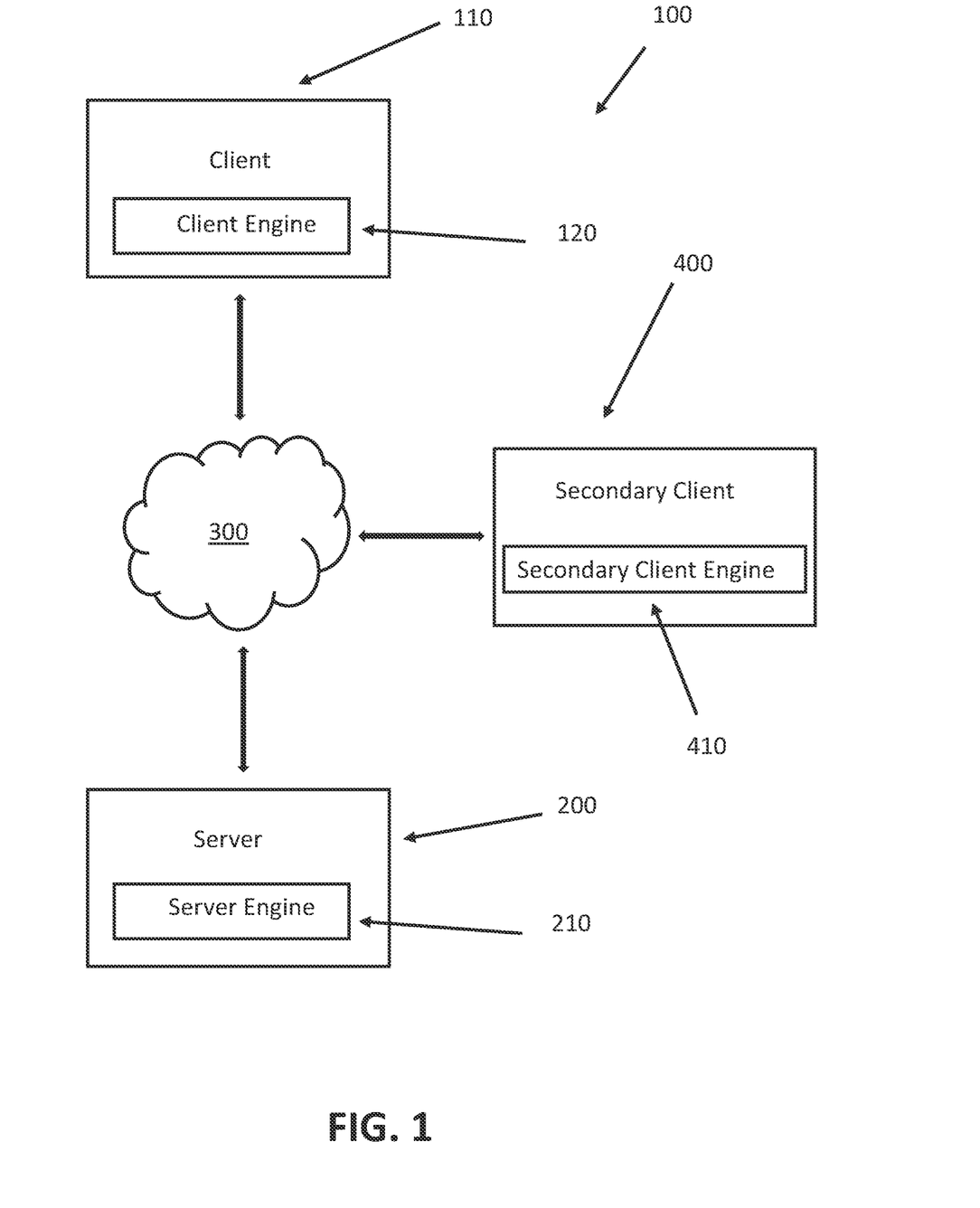
FIG. 1 discloses aspects of an operational environment for a system according to one embodiment of the present invention.

With particular attention now to FIG. 1, one example of an operating environment for embodiments of the invention is denoted generally at 100. In general, the operating environment 100 includes a client 110 that communicates with a server 200 via a network 300. The client 110 also communicates with a secondary client 400, such as when a user of the client 110 participates in a video conference with a user of the secondary client 400. In such situation, a client engine 120 at the client 110 can deliver a video stream to the secondary client 400, with the secondary client engine 410 presenting the video stream to the user of the secondary client 400 using a display or screen. The video stream can include both video data and audio data, with the server 200 and associated server engine 210 aiding in generating the video data. In contrast to video conference technologies that transmit real-time video data and real-time audio data captured through a camera and associated microphone at a client, the present invention delivers to the secondary client 400 a video stream combining real-time, or substantially real-time, audio with video data that has been altered or augmented by an output from a machine learned model, the machine learned model previously receiving an original video associated with the user of the client 110 that becomes the basis for the output video data. For instance, a pre-recorded original video of a user of the client 110 can be used as the basis for creation of output video data based in part on data or instructions from the machine learned model, this original video being stored at the server 200, a location of the server engine 210, or more generally at any location that can be accessed by the server 200 or the server engine 210. By so doing, the client 110 and the server 200 can continuously generate video for a video stream from captured audio data without capturing video data from the camera at the client 110. This reduces the processing requirements for the client 110, when the client 110 generates the video data to be used with real-time, or substantially real-time, audio data when the user of the client wishes to maintain the camera in an off state.

While the client engine 120 and the server engine 210 are illustrated as being disposed on the client 110 and the server 200 respectively, it will be understood that the client engine 120 and the server engine 210 can be disposed on the client 110 with the client 110 processing the video data and audio data as described herein. Further, the client engine 120 and the server engine 210 can be more generally referred to as "engines" and each can be an example of a first engine, a second engine, a third engine, etc. It is also understood that while the present disclosure discusses certain processing, methods, and functionality associated with each of the client, server, and secondary client, it will be understood that any of the processing, methods, and functionality can be performed on one or more of the clients, servers, and secondary clients.

Figure 2:
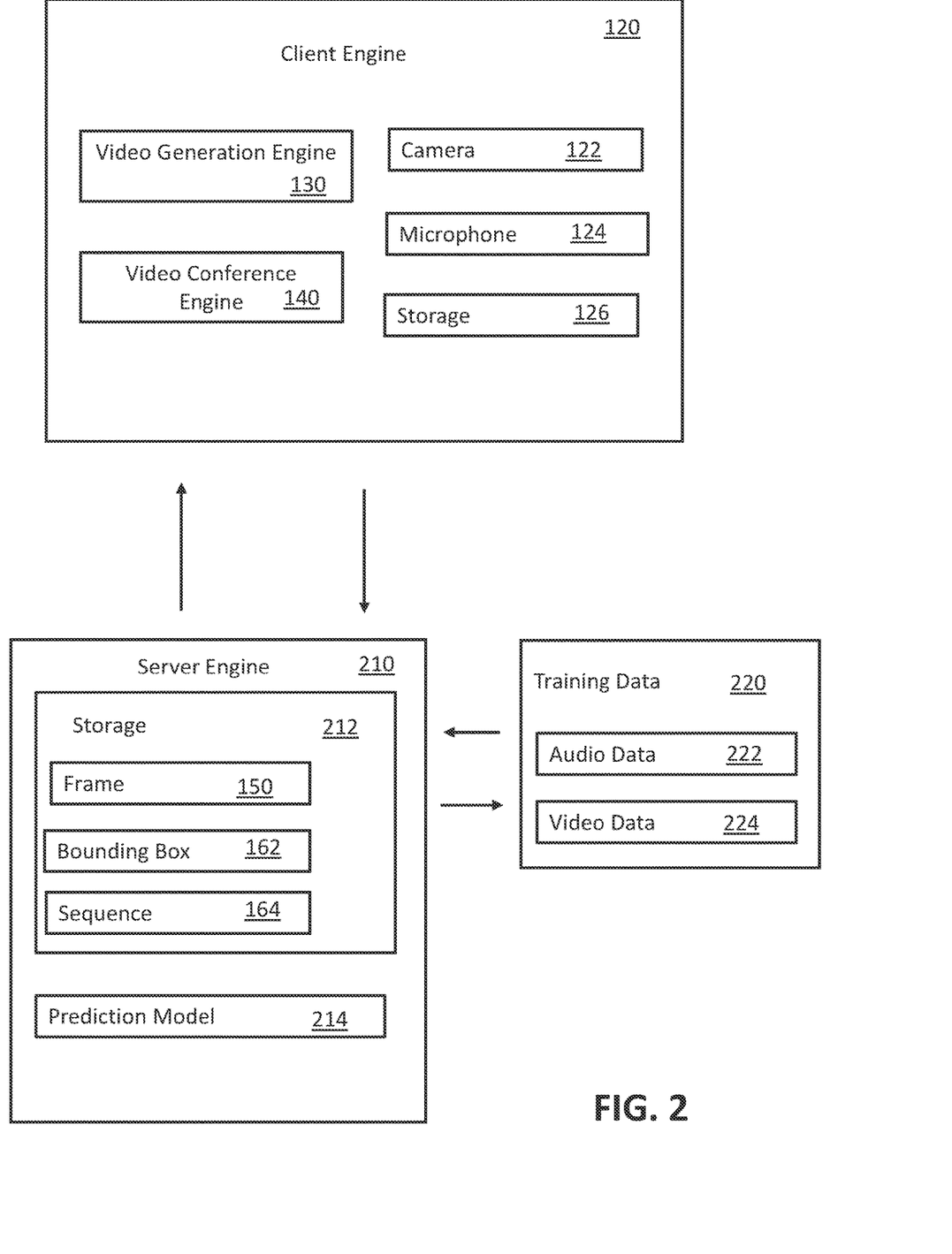
FIG. 2 discloses aspects of a client engine and a server engine of a system according to one embodiment of the present invention.

Turning to FIG. 2, the client 110 can communicate with the server 200 (the network 300 being omitted in FIG. 2 for simplification). The client engine 120 of the client 110 can include a camera 122 for capturing video data and a microphone 124 for capturing audio data. The captured data, both video and audio, can be stored in a storage 126 and be accessible by a video generation engine 130 that generates a video stream and a video conference engine 140 that can present the video stream to remote video conference engines, such as those associated with the secondary client 400 (FIG. 1). It will be understood that the video generation engine 130 and the video conference engine 140 can be combined into a single "engine" rather than being separate engines.

Rather than using the video data captured by the camera 122 during a video conference, the video generation engine 130, and more generally, the client engine 120 generates an alternate or "fake" video or video stream that is transmitted with the audio data captured by the microphone 124. An original video previously captured by the camera 122, and the audio data captured as part of a video conference, for instance, can be stored in the storage 126. The original video is used by the video generation engine 130 to generate a video stream used by the video conference engine 140 to present the user's image to the secondary client 400 (FIG. 1) without the camera 122 being in an on state. The video generation engine 130 alters or augments the original video based upon data received from the server 200 and generates the video stream that can be output as a single stream or as separate audio data stream and altered or augmented video data stream. This results in the video conference engine 140 delivering an alternate or "fake" video, i.e., real-time, or substantially real time audio data and generated or fabricated video data.

Figure 3:
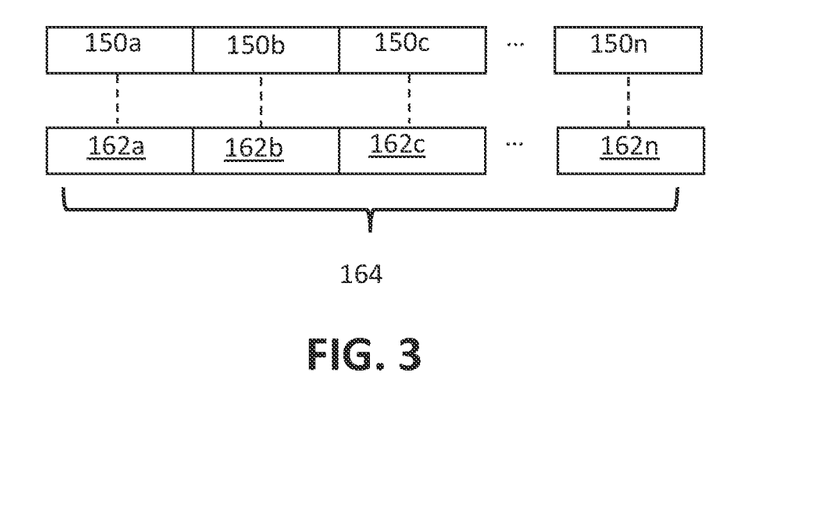
FIG. 3 discloses aspects of video data according to one embodiment of the present invention.
Figure 4:
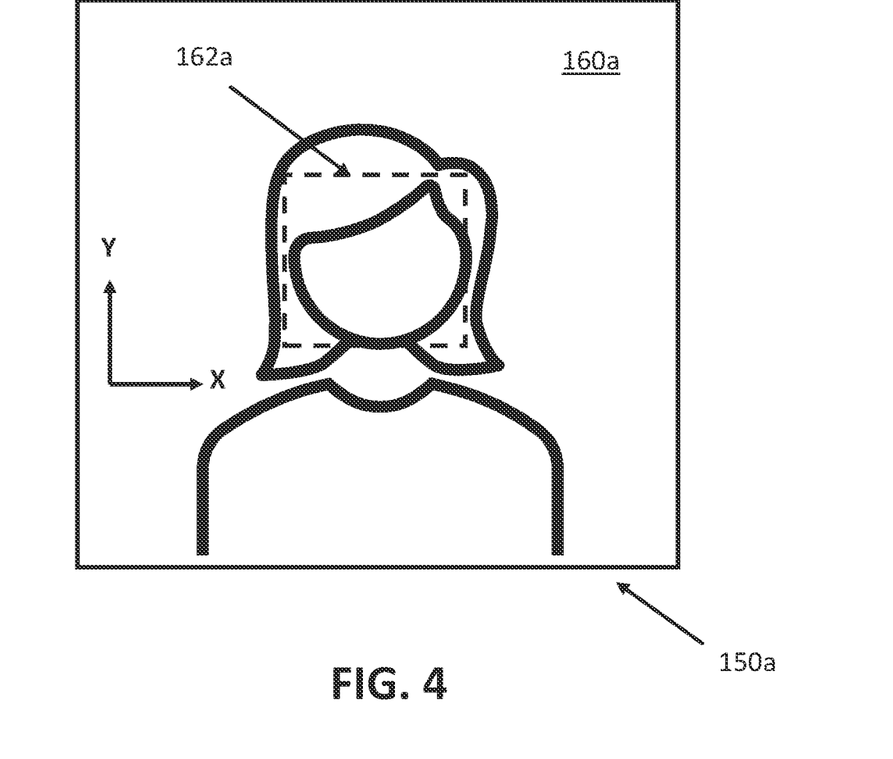
FIG. 4 discloses aspects of a frame of video data according to one embodiment of the present invention.

The video generation engine 130, or more generally the client engine 120, can prepare the original video for use in the operating environment 100 so that the output video can be generated by the video generation engine 130. The original video data is formed of a plurality of frames 150a-150n, illustrated schematically in FIG. 3, with each frame 150a-150n being an individual picture or image 160, such as illustrated in FIG. 4. The frames 150a-150n of FIG. 3 can be altered or augmented or one or more of the frames 150a-150n can be substituted or replaced with other frames of the plurality of frames 150a-150n according to the method, systems, and processes described herein to generate an output video by the client engine 120. The specific sequence of the frames 150a-150n can also be changed based upon data received from the server engine 210 so that the output video approximates the facial speaking movements of the user associated with the audio data captured by the microphone 124 while the camera 122 is in an off state.

To aid with achieving the facial approximation, once the original video is captured by the camera 122 and the microphone 124, facial features and other data points associated with each frame 150a-150n of the original video are detected. For instance, a face detection algorithm can be used with each frame 150a-150n of the original video. While reference will be made to frame 150a illustrated in FIG. 4, the discussion related to frame 150a is also applicable to any of the other frames 150a-150n. Like reference numerals will be used for like features, structures, or functions.

As illustrated, the frame 150a includes an image 160a. During processing of the frame 150a by the face detection algorithm, bounding box 162a is identified for the frame 150a. The bounding box 162a can include coordinates of the bounding box 162a defining the bounds of the face in the picture or image 160a. The bound box 162a is one of a plurality of bounding boxes 162a-162n associated with the plurality of frames 150a-150n, with one bounding box 162a-162n for each frame 150a-150n as schematically illustrated in FIG. 3. The portion of the image 160a within the bounding box 162a can be considered a face image. The coordinates of the bounding box 162a can include an x and y coordinate of an upper-left corner and a lower-right corner of a rectangle forming the bounding box 162a, an x and y coordinate of a middle of the rectangle with a width and height of the bounding box 162a, or other coordinate system identifying the details and location of the bounding box 162a.

The processing of the frames 150a-150n generates a bounding box sequence 164 defining the sequence of the bounding boxes 162a-162n for those frames 150a-150n, as schematically illustrated in FIG. 3. Stated another way, processing each frame 150a-150n of the original video generates a bounding box sequence 164 of the bounding boxes 162a-162n, the bounding boxes 162a-162n defining the location of the face images one each frame 150a-150n.

The bounding box sequence 164 and associated bounding boxes 162a-162n are saved and made available to the client 110 and the server 200. For instance, the data generated from the face detection algorithm can be stored in at least one of storage 126 and storage 212 and can be made available to the client engine 120 and the server engine 210. In some embodiments, the data associated with the bounding boxes 162a-162n, such as the bounding box data, and the bounding box sequence 164, only needs to be accessible by the server engine 210. In other embodiments, both the client engine 120 and the server engine 210 can have access to the data associated with the bounding boxes, including the bounding box sequence 164. By processing the data for the original video using the face detecting algorithm, faster computation by the server engine 210 can be achieved. The face detection algorithm can be a model similar to the one in Wav2Lip found at https://github.com/Rudrabha/Wav2Lip, a neural network or other machine learning network.

Returning to FIG. 2, the server engine 210 includes a storage media 212 and a prediction model 214. The server storage media 212 can store an instance of the original video and other details of the original video that can also be stored at the client engine 120. For instance, the server storage 212 can store one or more of the frames 150a-150n, data associated with the bounding boxes 162a-162, such as at least the coordinate information for each bounding box, and the bounding box sequence 164. Some of this data can be used by the prediction model 214 to generate substitute frame data or data which details frames of the plurality of frames 150a-150n of the original video to alter or augment or substitute with another frame when the video generation engine 130 creates the video stream delivered to the video conference engine 140. The prediction model 214 can, therefore, output a list of face images, with associated bounding box coordinates, which can be used by the client engine 110 to stitch altered face images into those frames from where the images were taken to generate an altered or augmented frame that is output in lieu of the unaltered frame.

The prediction model 214 is pre-trained using training data 220, including training audio data 222 and training video data 224. In some embodiments, the original video can form part of the training data 220. Additionally, the prediction model 214 can be trained using human faces and audio clips of human speech to predict what the human face (with emphasis on the movement of the mouth) should look like in each frame of a video given an audio segment or chunk. The prediction model 214 can be trained on generic data, highly personalized data, a user's own data, or combination or modifications thereof. With the prediction model 214 pre-trained, the computational complexity associated with processing the audio and video data to achieve the predicted video data, such as the replacement, altered, or augmented frames, is reduced.

The server engine 210 houses the prediction model 214, and generates body movement predictions based on audio and video input, such as the audio data and certain video data. The prediction model 214 can predict facial speaking movements based upon the received audio data and the previous received original video. With the computational pieces of the method and process flow broken up between the client 110 and the server 200 data transfer is minimized while allowing the most computationally heavy processes to take place on the server 200 in the event that the client 110 is not powerful enough to perform these calculations sufficiently fast, and the server 200 is being run elsewhere on hardware with better resources. The distributed processing allows for the client engine 120 to perform limited video processing locally, while the server engine 210 and the prediction module 214 can run on a more powerfully processing platform or system than the client engine 120.

As mentioned above, the client engine 120 and server engine 210 communicate so that the sever engine 210 can predict which and how to alter, augment, or substitute one or more of the frames 150a-150n to approximate facial features, such as speaking movements, of a user's face based upon the captured audio data. The client engine 120 captures contiguous sound data chunks, blocks, and/or segments of raw audio data for a predetermined time and sends that audio data, together video relationship data between the original video and the audio data, such as start and end frame indices, timestamps, and other data correlating or synchronizing the original video with the audio data, to the server engine 210. The server engine 210 uses the data received from the client engine 120 to generate a list of face images (i.e., the bounding boxes 162a-162d), and associated frames 150a-150n. The list of face images (i.e., the bounding boxes 162a-162d), and associated frames 150a-150n, and the captured audio data are inputs to the prediction model 214. The prediction model 214 outputs substitute frame data detailing which face images of the original video images are to be altered, augmented, or replaced to generate the alternate or "fake" video. The prediction model 214 outputs a list face images, with bounding box coordinates, which will be stitched into one or more of the frames 150a-150n to generate alternate, augmented, or substitute frames that can replace or be inserted into an output video instead of the original video so that the facial movement depicted in the streamed output video from the client engine 110 approximate the captured real-time or substantially real-time audio data. When the client engine 120 receives the predictive data, the video generation engine 130 stitches the updated or altered images 160a-160n into the frames 150a-150n to generate altered output video data having the updated or altered images shown by the video conference engine 140 in lieu of those images of the original video to be streamed as the looped original video. The output video data and the audio data from the client engine 120 can be streamed or otherwise delivered to the video conference engine 140 to deliver the output video and the audio data as a virtual camera to the secondary client 400 (FIG. 1). The updated or altered images and the audio data can be output together as a single data stream, or output separately. The processes by which the two streams, i.e., the audio stream and the updated or altered faces, can be synchronized and output using any existing protocol or algorithm, can include matching expected audio and video play times using aligned markers and appropriate buffering protocols so that the audio is matched with the video.

The output video from the video conference engine 140 can be delayed by an amount of time corresponding to a length of the audio segments which are captured by the client engine 120 and sent to the server 200 or server engine 210 for processing, and the amount of time taken by the server 200 or server engine 210 to perform the processing. However, as long as the time taken by the server 200 or server engine 210 to perform the processing is less than or equal to the length of the audio segments, after this short delay, the output can be produced without further lag. This is particularly the case, when the client engine 120 and the server engine 210 are contained within the same hardware device, such as the same laptop, personal computer, or other hardware device. As such, the new output video is produced in segments quickly enough to be used as a continuous output.

D. Example Methods

Figure 5:
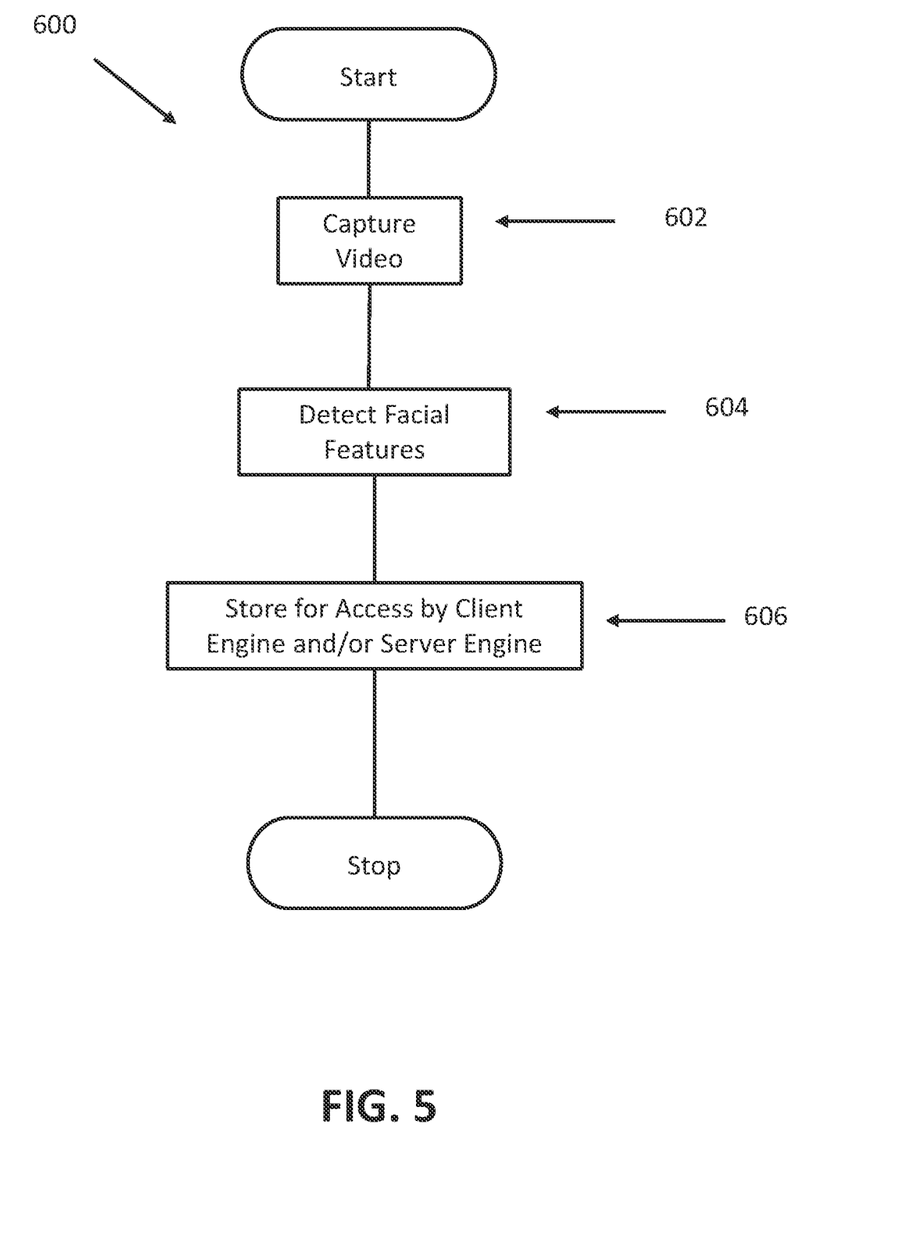
FIG. 5 discloses aspects of a method for processing video data according to one embodiment of the present invention.
Figure 6A:
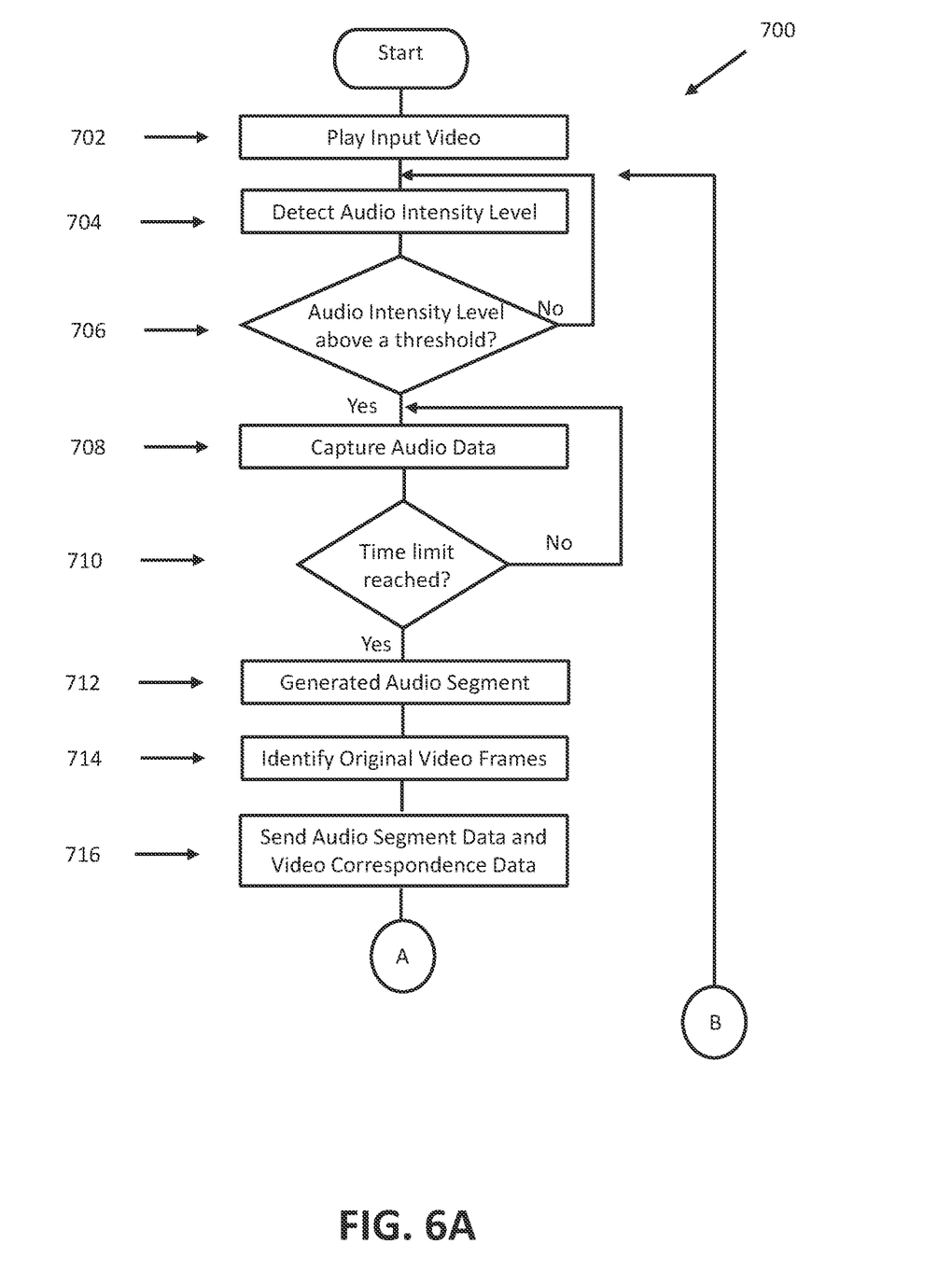
FIGS. 6A-6B discloses aspects of a method for continuously video generations from audio data according to one embodiment of the present invention.
Figure 6B:
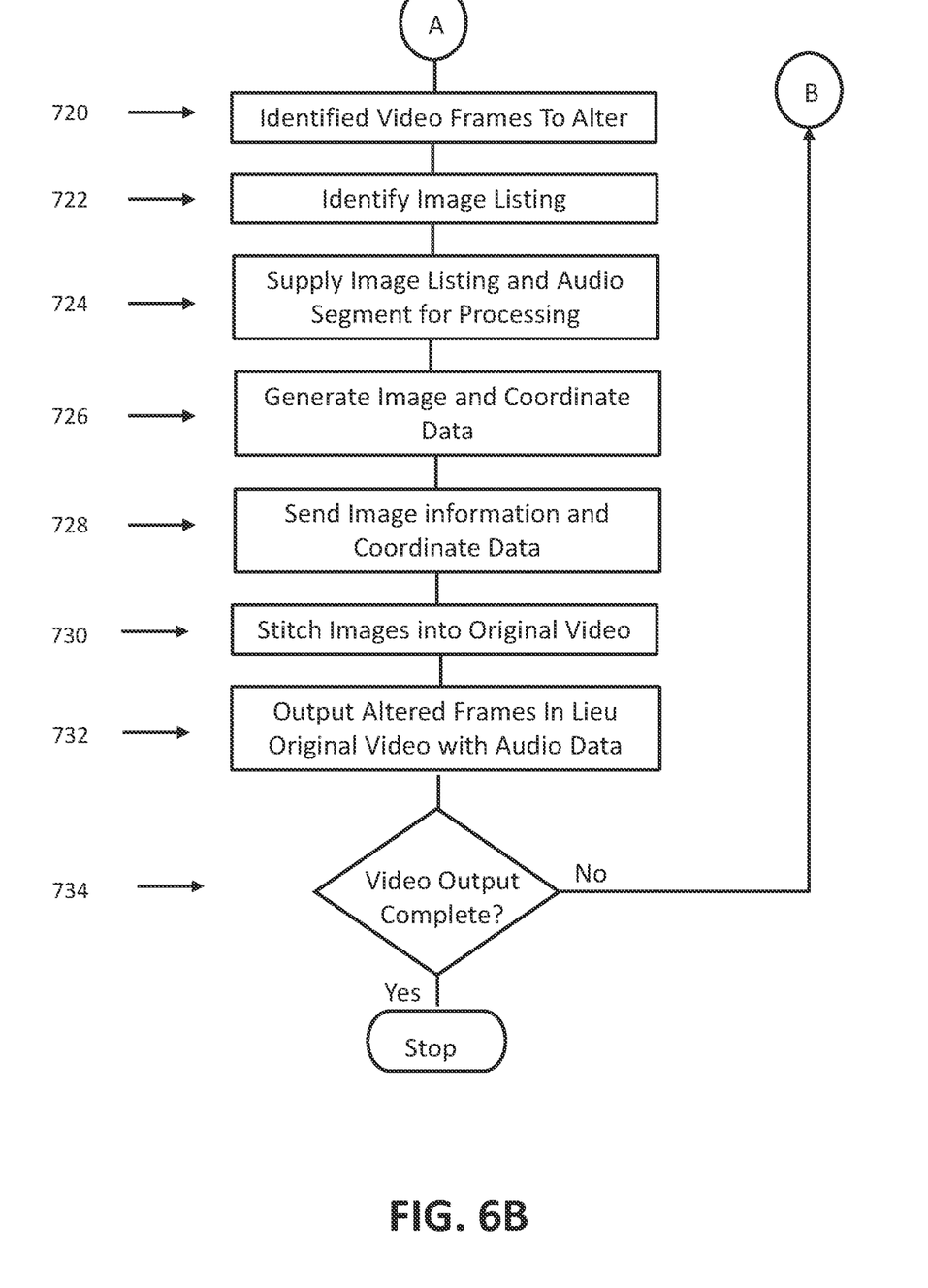
Figure 7:
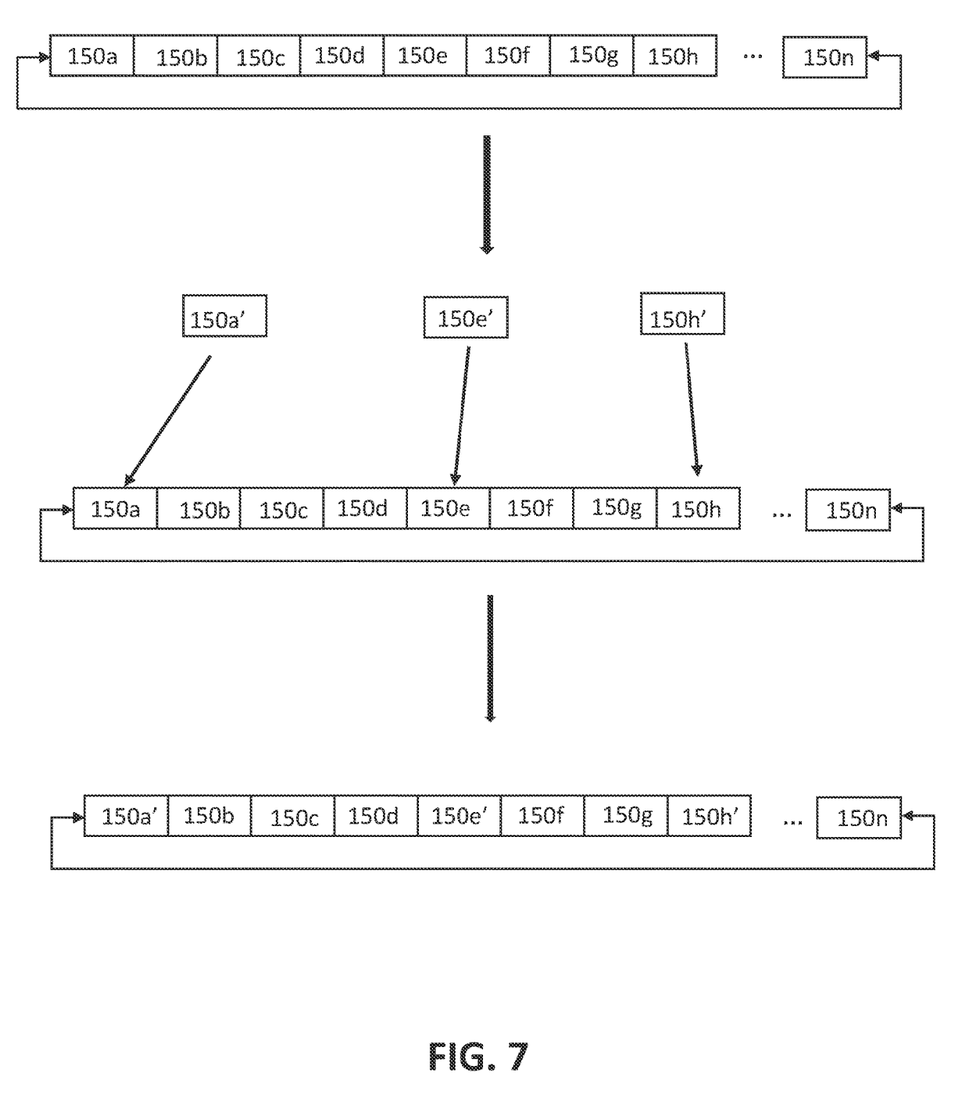
FIG. 7 discloses aspects of a method for generating video data according to one embodiment of the present invention.

It is noted with respect to the example method of FIGS. 5-7 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 5, which illustrates a method 600 for pre-processing an input video in preparation for generating the altered or augmented video by the client engine 120. As illustrated, a user records or captures a video of themselves (602), such as the original video. This video is used as a basis for or with the pre-trained prediction model 214 for video creation of the altered or augmented video. Since the prediction model 214 is pre-trained, such as on human faces and audio clips of human speech to predict what the human face, and is used to predict facial speaking movements rather than being trained at the time of processing the audio data and relationship data, the model training can be performed far in advance of the prediction model 214 being used to generate the altered or augmented video according to the methods, systems, and processes described herein.

In one configuration, recording or capturing the original video could follow one or more rules. For instance, if the original video shows the user's face looking toward the camera 122, the prediction model 214 can more easily replace the necessary features of the user's face in the augmented video. If the original video shows the user behaving normally, comfortably and with minimal movements, then the original video, in an unaltered state, can be played when there is no audio, saving processing power. If the user is in roughly the same position at the start and end of the original video, then it can be smoothly looped. If the original video is sufficiently long, then the continuous looping will not be distracting. For instance, the original video can have a length greater than about 20 seconds, greater than about 30 seconds, greater than about 60 seconds, between about 20 seconds to about 1 hour, from about 30 seconds to about 30 minutes, from about 60 seconds to about 15 minutes, or other lengths greater or lesser than those described herein so that, the continuous looping of the original video may not be distracting.

Once the user has captured the original video, facial features and other data points associated with each frame 150a-150n are detected (604). For instance, a face detection algorithm can be performed on each frame 150a-150n of the original video, identifying coordinates, bounding boxes, and a sequence of bounding boxes for the user's face which correspond to each frame 150a-150n. The face detection algorithm can include a neural network or a machine learning model.

This data generated from the face detection algorithm is stored in at least storage 126 and/or storage 212, or otherwise made available to the client engine 120 and the server engine 210 (606). In some embodiments, the data associated with the bounding boxes 162a-162n and/or the sequence of bounding boxes 164, only needs to be accessible by the server engine 210. In other embodiments, both the client engine 120 and the server engine 210 can have access to the data associated with the bounding boxes. By processing the original data using the face detecting algorithm, faster computation of the face prediction by the prediction model 214 can be achieved.

Turning to FIG. 6A, once the original video has been recorded and the facial features and other pertinent video data determined, it is possible to generate the altered or augmented output video to be streamed from the client 110 (700), i.e., the output video uses altered or augmented pre-recorded or pre-captured video and real-time, or substantially real-time audio data, which are combined into the video stream based upon, at least in part, the data output from the prediction model 214.

Initially, when a user at the client 110 chooses to begin a video conference, for instance, the client engine 120 beings to display or deliver the original video as the output vide even before any audio data is captured (702). The client engine 120 tracks the stream of the original video and will continue to use the original video as output from the video conference engine 140, looping the output video as necessary until audio data is captured (schematically illustrated in FIG. 7).

As the output video is delivered, the client engine 120 detects a noise, audio intensity level, or volume level through the microphone 124 (704). The client engine 120 determines if the detected audio intensity level or volume level is above a pre-determined threshold (706). For instance, the threshold can be about 60 dB, from about 30 dB to about 70 dB, from about 40 dB to about 65 dB, or an audio intensity level or volume level above the surrounding ambient noise. For instance, the microphone 124, or another microphone 128, can detect or capture ambient noise levels and the client engine 120 can detect when the audio intensity level is higher than the ambient audio level and so detect when the user is speaking. By detecting when the user is speaking rather than a general high audio background or ambient audio intensity level, the length and number of audio segments captured and subsequently sent to the server engine 210 is reduced, and so the processing requirements of the client engine 120 and the server engine 210 are also reduced by reducing the possibility of the client engine 120 capturing excessive or unwanted audio data. Additionally, or optionally, the client engine 120 can use the dual microphone configuration of microphones 124 and 128 to filter out the ambient or background noise so that substantially only the audio data associated with the user's speech is captured and subsequently used by the server engine 210 for processing and output by the client engine 120 as part of the output video. For instance, the client engine 120 can filter the audio data received from the microphone 128 from the audio data received from the microphone 124, or vice versa, to generate the audio data that will be used by the server engine 210 and client engine 120 as described herein.

With continued reference to FIG. 6A, if the audio intensity level or volume level is below the pre-determined threshold, such as when the decision block 706 is in the negative, the client engine 120 continues to detect the audio intensity level or volume level until and audio intensity level meeting the threshold is identified. When an audio intensity level or volume level higher than the pre-determined threshold is identified or detected, such as when decision block 706 is in the affirmative, the client engine 120 begins to save the raw audio data (708), or audio data in the raw audio format, such as in contiguous sound data chunks, blocks, and/or segments of raw audio data, and continues to save the audio data for a predetermined time (710). The pre-determined time is small enough to avoid lag, such as about 0.5 seconds, about 0.33 seconds, about 0.25 seconds, about 0.1, or other range of seconds based processing parameters and communication speed between the client engine 120 and the server engine 210.

While reference is made to saving the raw audio data, it will be understood that in other embodiments, and more generally, the client engine 120 can store or save the data in a variety of audio formats, such as but limited compressed, uncompressed, lossless compressed, lossy, or other audio data format. Additionally, by selectively capturing the raw audio data so that the client engine 120 captures the raw audio data when it is above a threshold audio intensity level or volume level typically associated with normal speak, the unneeded processing is avoided and so the quantity of data sent to the server engine 210 is reduced. For instance, when a user at the client 110 is quiet or silent the client engine 120 does not save audio data and so no data is sent saving processing capabilities.

Once the time limit is reached and a full segment of audio data is collected and stored (712), i.e., the full segment being the quantity of audio data to be saved for the pre-determined time, the client engine 120 uses its current location in the original video, a frame rate of the original video, a length of the audio segment, and an expected computation time of the server engine 210 to determine which frames 150a-150n of the original video correspond to the audio segment (714). This calculation produces video relationship data that can include start and end frame indices or timestamps, which are sent to the server 200 and server engine 210 along with the audio data (716). If the server 200 or server engine 210 does not have access to the original video, the video relationship data can also include the frames of the plurality of frames 150a-150n to be altered by the prediction model 214 instead of the start and end indices.

Following identifying the original video frames, the client engine 120 sends the audio data and video relationship data to the server 200 (716). The video relationship data includes information describing which frames of the plurality of frames 150a-150n of the original video should be used by the prediction model 214 to predict the facial movements corresponding to the transmitted audio data. By only sending the audio data and the video relationship data to generate the altered or augmented video, processing speeds can be increased and latency in communication between the client 110 and the server 200 can be reduced. Delays in communication can be further be reduced by changing the pre-determined time for capturing the audio data. For instance, by decreasing the pre-determined time a corresponding reduction in the chunk size of the audio data can be achieved.

After the audio data and video relationship data is sent to the server engine 210, the audio capture process and audio segment generation performed by the client engine 120 can be repeated until the audio data does not need to be captured, such as at the end of a video broadcast. For instance, the client engine 120 continues to identify an audio intensity level or volume level, capture the audio data for a pre-determined time, and send the audio segment and video relationship data to the server 200 until the audio data does not need to be captured. Because the volume threshold or audio intensity level threshold are checked during audio collection, the server 200 or server engine 210 will not be overloaded with silent audio data which does not require processing.

Turning to FIG. 6B, upon receipt of the audio data and the video relationship data, the server engine 210 beings to process the audio data with the prediction model 214. When the server 200 or server engine 210 receives the request from the client engine 120, it has either been given the frames 150a-150n associated with the audio segment or constructs the sequence of frames of the plurality of frames 150a-150n of the original video stored at the server 200 that are to be altered to approximate the facial movement corresponding to the audio data (720). Using the selected frames, and data representative of the stored bounding boxes, the server engine 210 generates a list of face images, with one face image per frame, to be used as an input to the prediction model 214 (722). The listing of face images, which are associated with the bounding boxes 162a-162n, along with the audio segment are provided as inputs to the prediction model 214 (724). As mentioned previously, the prediction model 214 has been pre-trained on human faces and audio clips of human speech to predict what the human face (with emphasis on the movement of the mouth) should look like in each frame given the audio segment.

Using the list of face images, the prediction model 214 outputs substitute frame data that can include a computed list of face images and the coordinates associated with the bounding boxes 162a-162n for those images. The list of face images and coordinates are used by the client engine 120 to generate the altered or augmented frames that are substituted for or replace particular frames 150a-150n of the original video. The face images are stitched into and replace the face images in one or more frames 150a-150n of the original video to create altered frames that are inserted back into original video (726).

The output from the prediction model 214, and/or the server engine 210, is schematically illustrated in FIG. 7. The prediction module 214 identifies, for instance, substitute images in frames 150a, 150e, and 150h and provides the list of corresponding face images and coordinates for the associated bounding boxes that the client engine 120 uses to substitute altered frames 150*a*', 150*e*', and 150*h*' for frames 150*a*, 150*e*, and 150*h* in the specific location of the original video. The altered frames 150*a*', 150*e*', and 150*h*' combine a portion of the image 160*a*-160*n* from the original video and an altered face image or the portion of the image bounded by the bounding box, identified by the prediction module 214.

The details of which of frames 150*a*-150*n*, and associated images and bounding box data 162*a*-162*n*, to be altered or augmented is sent to the client engine 120 (728), where the client engine 120 stitches the updated or altered face images into the frames 150*a*-150*n* to generate an altered output video (730), and those updated or altered images and frames, with the associated and corresponding audio data, are shown in lieu of the unaltered ones at the appropriate moment in the video output loop of the original video (732). As illustrated in FIG. 7, the frames 150*a*', 150*e*', and 150*h*' replace the frames 150*d*, 150*e*, and 150*h*. Instead of altering frames, it would be understood that one or more additional frames, with associated face images, can be inserted between frames of the looped output video.

The altered output video and the audio data from the client engine 120 can be streamed or otherwise delivered to the video conference engine 140. The video conference engine 140 uses the altered output video as a virtual camera for the stream to the secondary client 400 (FIG. 1). The updated or altered sequence of images or frames and the audio data can be output together as a single data stream, or output separately, i.e., two separate streams. The processes by which the two streams, i.e., the audio stream and the updated or altered image and frames can be synchronized and output using any existing protocol or algorithm. For instance, the synchronization protocol or algorithm can include matching expected audio and video play times using aligned markers and appropriate buffering protocols so that the audio is matched with the video.

E. Further Example Embodiments

Following are some further example embodiments of the invention. These are presented only by way of example and are not intended to limit the scope of the invention in any way.

Embodiment 1. A method, comprising: selectively capturing audio data at a first engine while outputting an output video, the output video being based upon an original video stored at the first engine; delivering the captured audio data to a prediction engine upon the captured audio data being captured for a pre-determined time; receiving from the prediction engine substitute frame data used by first client engine to replace a first frame of the output video with an altered first frame; and following replacing the first frame in the output video with the altered first frame to generate altered video data, outputting the captured audio data and the altered video data from the first engine.

Embodiment 2. The method as recited in embodiment 1, wherein outputting the capture audio data and the altered video comprises outputting the capture audio data and the altered video data as a single data stream or as separate data streams.

Embodiment 3. The method as recited in any of embodiments 1-2, wherein the first frame comprises a first image and a first face image and the altered first frame comprises the first image and an altered face image.

Embodiment 4. The method as recited in any of embodiments 1-3, wherein capturing audio data at the first engine comprises capturing audio data when audio is above a threshold intensity level.

Embodiment 5. The method as recited in any of embodiments 1-4, wherein capturing audio data at the first engine comprises capturing audio data when audio is above a threshold intensity level.

Embodiment 6. The method as recited in any of embodiments 1-5, wherein the prediction engine and the first engine are on a first hardware device.

Embodiment 7. The method as recited in any of embodiments 1-6, further comprising pre-processing the original video to identify a plurality of bounding boxes.

Embodiment 8. The method as recited in any of embodiments 1-7, the method, comprising streaming from a client engine an output video, the output being based upon an original video stored at the client engine, the original video including a first frame with a first image and a first face image of a user of the client engine; while the original video is being output by the client engine, selectively capturing audio data of the user for a predetermined time and generating an audio segment; delivering the audio segment and video relationship data to a server engine; and following receiving substitute frame data, stitching an altered first face image into the first frame identified by the substitute frame data to generate an altered first frame and outputting the altered first frame in the output video in lieu of the first frame.

Embodiment 9. The method as recited in any of embodiments 1-8, wherein the output video is a looped version of the original video.

Embodiment 10. The method as recited in any of embodiments 1-9, wherein the altered first frame comprises the first image and an altered face image.

Embodiment 11. The method as recited in any of embodiments 1-10, wherein capturing audio data at the client engine comprises: detecting an intensity level of audio signal received by a microphone; determining if the intensity level is above or below a threshold; and capturing audio data when the intensity level is above the threshold.

Embodiment 12. The method as recited in any of embodiments 1-11, wherein the video relationship data comprises start and end frame indices of the original video.

Embodiment 13. The method as recited in any of embodiments 1-12, further comprising generating the video relationship data by identifying a current location of the original video, a frame rate of the original video, a length of the audio segment, and an expected computation time of the server engine to determine a correspondence between the first frame of the original video and the audio segment.

Embodiment 14. The method as recited in any of embodiments 1-13, wherein outputting the altered frame comprises sending the altered frame to a video conference engine to deliver the altered frame to a secondary client separate from the client and the server.

Embodiment 15. The method as recited in any of embodiments 1-14, wherein the video conference engine outputs the altered frame as a virtual camera.

Embodiment 16. The method as recited in any of embodiments 1-15, wherein outputting the captured audio data and the altered video comprises outputting the capture audio data and the altered video data as a single data stream Embodiment 17. The method as recited in any of embodiments 1-16, wherein the client engine is associated with a client and the server engine is associated with a server, the client and the server being in communication through a network.

Embodiment 18. The method as recited in any of embodiments 1-17, wherein the output video is a looped version of the original video.

Embodiment 19. The method as recited in any of embodiments 1-18, wherein one of the storage media types is dedupe storage, and another of the storage media types is object storage.

Embodiment 20. A method for performing any of the operations, methods, or processes, or any portion of any of these, disclosed herein.

Embodiment 21. A non-transitory storage medium having stored therein instructions that are executable by one or more hardware processors to perform operations comprising the operations of any one or more of embodiments 1 through 20.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
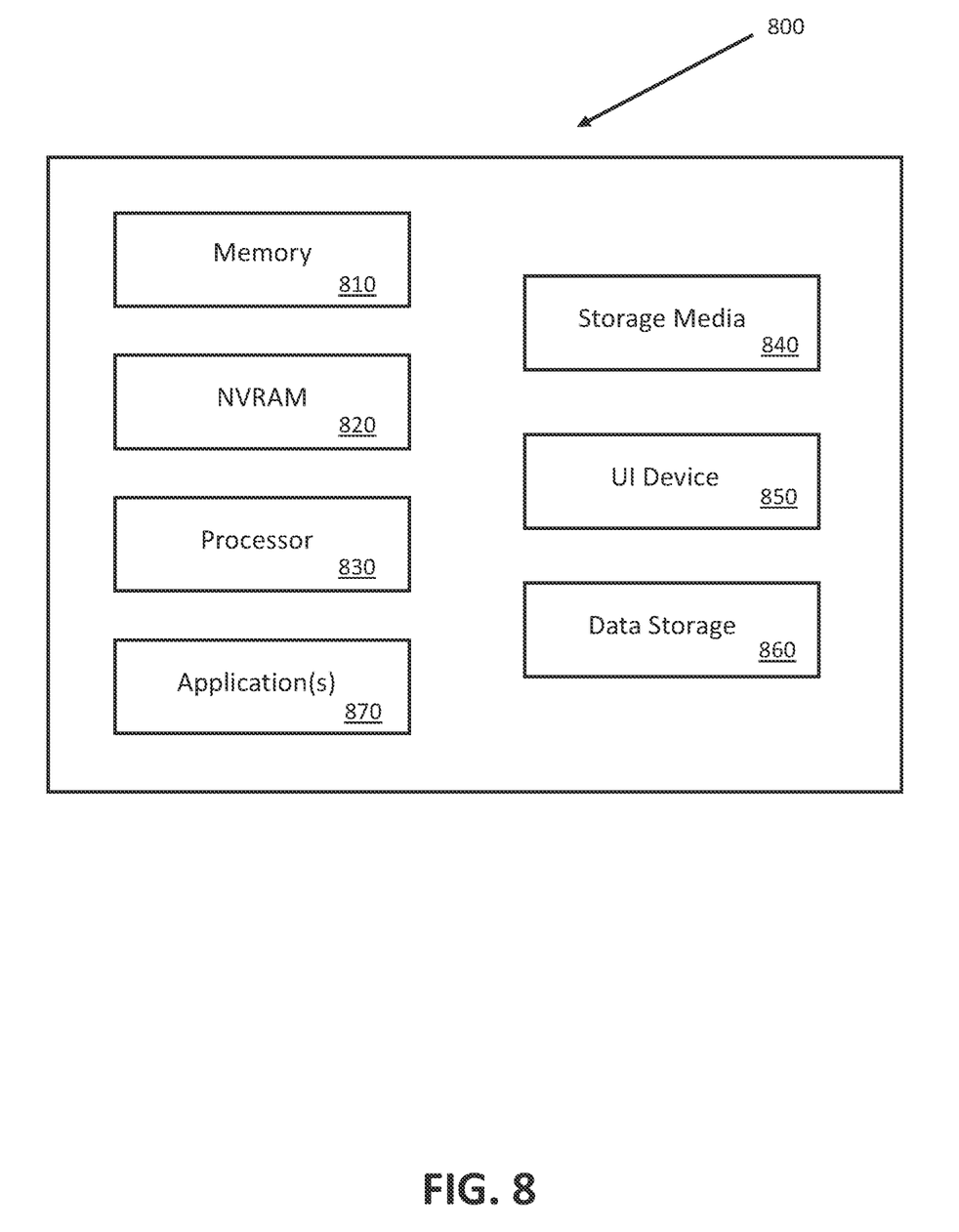
FIG. 8 discloses aspects of a hardware device for use with the methods, processes, and systems of the present invention.

With reference briefly now to FIG. 8, any one or more of the entities disclosed, or implied, by FIGS. 1-7B and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 810 which may include one, some, or all, of random access memory (RAM), non-volatile memory (NVM) 820 such as NVRAM for example, read-only memory (ROM), and persistent memory, one or more hardware processors 830, non-transitory storage media 840, UI device 850, and data storage 860. One or more of the memory components of the physical computing device 800 may take the form of solid state device (SSD) storage. As well, one or more applications 870 may be provided that comprise instructions executable by one or more hardware processors 930 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    selectively capturing audio data at a first engine while outputting an output video, the output video being based upon an original video stored at the first engine;
    delivering the captured audio data to a prediction engine upon the captured audio data being captured for a pre-determined time, wherein the pre-determined time is small enough to avoid lag;
    receiving from the prediction engine substitute frame data used by first client engine to replace a first frame of the output video with an altered first frame, wherein the substitute frame data details which face images of the original video may be altered; and
    following replacing the first frame in the output video with the altered first frame to generate altered video data, outputting the captured audio data and the altered video data from the first engine.

2. The method of claim 1, wherein the output video is a looped version of the original video.

3. The method of claim 1, wherein outputting the capture audio data and the altered video comprises outputting the capture audio data and the altered video data as a single data stream.

4. The method of claim 1, wherein outputting the capture audio data and the altered video comprises outputting the captured audio data and the altered video data as separate data streams.

5. The method of claim 1, wherein the first frame comprises a first image and a first face image and the altered first frame comprises the first image and an altered face image.

6. The method of claim 1, wherein capturing audio data at the first engine comprises capturing audio data when audio is above a threshold intensity level.

7. The method of claim 1, wherein capturing audio data at the first engine comprises capturing audio data when audio is above a threshold intensity level.

8. The method of claim 1, wherein the prediction engine and the first engine are on a first hardware device.

9. The method of claim 1, further comprising pre-processing the original video to identify a plurality of bounding boxes.

10. A method, comprising:
    streaming from a client engine an output video, the output being based upon an original video stored at the client engine, the original video including a first frame with a first image and a first face image of a user of the client engine;
    while the original video is being output by the client engine, selectively capturing audio data of the user for a predetermined time and generating an audio segment, wherein the pre-determined time is small enough to avoid lag;
    delivering the audio segment and video relationship data to a server engine; and
    following receiving substitute frame data, wherein the substitute frame data details which face images of the original video may be altered, stitching an altered first face image into the first frame identified by the substitute frame data to generate an altered first frame and outputting the altered first frame in the output video in lieu of the first frame.

11. The method of claim 10, wherein the output video is a looped version of the original video.

12. The method of claim 11, wherein the altered first frame comprises the first image and an altered face image.

13. The method of claim 12, wherein capturing audio data at the client engine comprises:
    detecting an intensity level of audio signal received by a microphone;
    determining if the intensity level is above or below a threshold; and
    capturing audio data when the intensity level is above the threshold.

14. The method of claim 13, wherein the video relationship data comprises start and end frame indices of the original video.

15. The method of claim 14, further comprising generating the video relationship data by identifying a current location of the original video, a frame rate of the original video, a length of the audio segment, and an expected computation time of the server engine to determine a correspondence between the first frame of the original video and the audio segment.

16. The method of claim 15, wherein outputting the altered frame comprises sending the altered frame to a video conference engine to deliver the altered frame to a secondary client separate from the client and the server.

17. The method of claim 16, wherein the video conference engine outputs the altered frame as a virtual camera.

18. The method of claim 17, wherein outputting the captured audio data and the altered video comprises outputting the capture audio data and the altered video data as a single data stream.

19. The method of claim 18, wherein the client engine is associated with a client and the server engine is associated with a server, the client and the server being in communication through a network.

20. A non-transitory storage medium having stored therein instructions that are executable by one or more hardware processors to perform operations comprising:
    capturing audio data at a client engine while outputting an output video, the output video being based upon an original video stored at the client engine;
    delivering the captured audio data to a prediction engine upon the captured audio data being captured for a pre-determined time, wherein the pre-determined time is small enough to avoid lag;
    receiving from the prediction engine substitute frame data used by the client engine to replace a first frame of the output video with an altered first frame, wherein the substitute frame data details which face images of the original video may be altered; and
    following replacing the first frame in the output video with the altered first frame to generate altered video data, outputting the captured audio data and the altered video data from the client engine.

* * * * *